(12) United States Patent
De'Longhi

(10) Patent No.: US 9,468,331 B2
(45) Date of Patent: Oct. 18, 2016

(54) DEVICE ASSOCIABLE TO A STEAM DISPENSER FOR PRODUCTION OF AN AROMATIC BEVERAGE AND A COFFEE MACHINE EXHIBITING THE DEVICE

(75) Inventor: Giuseppe De'Longhi, Treviso (IT)

(73) Assignee: De'Longhi Appliances S.R.L., Treviso (IT)

( * ) Notice: Subject to any disclaimer, the term of this patent is extended or adjusted under 35 U.S.C. 154(b) by 257 days.

(21) Appl. No.: 13/581,334

(22) PCT Filed: Mar. 2, 2011

(86) PCT No.: PCT/EP2011/053132
§ 371 (c)(1),
(2), (4) Date: Aug. 27, 2012

(87) PCT Pub. No.: WO2011/113700
PCT Pub. Date: Sep. 22, 2011

(65) Prior Publication Data
US 2013/0000490 A1  Jan. 3, 2013

(30) Foreign Application Priority Data
Mar. 17, 2010 (IT) .............................. MI2010A0436

(51) Int. Cl.
A47J 31/44 (2006.01)
A47J 43/046 (2006.01)

(52) U.S. Cl.
CPC ......... *A47J 31/4489* (2013.01); *A47J 43/0465* (2013.01)

(58) Field of Classification Search
CPC ..................... A47J 43/0465; A47J 31/4489
USPC ........................................ 99/293, 294, 323.1
See application file for complete search history.

(56) References Cited

U.S. PATENT DOCUMENTS 5,460,846 A * 10/1995 Stumphauzer ............ A23L 2/54
    261/DIG. 7
5,746,113 A * 5/1998 Ko ................................. 99/323

(Continued)

FOREIGN PATENT DOCUMENTS

DE  EP 1197175 A1 * 4/2002 .......... A47J 31/4485
DE  202005021112  4/2007

(Continued)

OTHER PUBLICATIONS

International Search Report and Written Opinion; International Application No. PCT/EP2011/053132; International Filing Date: Mar. 2, 2011; 9 pages.

(Continued)

*Primary Examiner* — Dana Ross
*Assistant Examiner* — Kuangyue Chen
(74) *Attorney, Agent, or Firm* — Blank Rome LLP

(57) ABSTRACT

The device (1) associable to a steam dispenser (2) for making an aromatic beverage comprises a container (5) to which a closing cover (6) is removably applied, supporting either directly or indirectly both at least a tube (7) for conveying the steam, sealingly connectable to the steam dispenser (2) and configured such as to exhibit at least a steam outlet (8) below a minimum liquid level (9) provided in the container (5) for making the aromatic beverage, and at least a stirrer (10) positioned adjacent to the inside wall of the container (5) below the minimum level (9) and exhibiting at least a permanent magnet (11,12) for receiving rotary motion from a motor (13) having permanent magnets (14, 15) and being located externally of the container (5).

16 Claims, 4 Drawing Sheets

(56) References Cited

U.S. PATENT DOCUMENTS

| | | | |
|---|---|---|---|
| 6,439,760 B1 * | 8/2002 | Langeloh | A47J 36/32 366/206 |
| 8,528,468 B2 * | 9/2013 | Boussemart et al. | 99/323.1 |
| 2011/0041704 A1 * | 2/2011 | Feierabend | 99/323.1 |

FOREIGN PATENT DOCUMENTS

| | | | | |
|---|---|---|---|---|
| EP | 1197175 | | 4/2002 | |
| EP | 1197175 A1 * | | 4/2002 | |
| EP | 1597992 | | 11/2005 | |
| FR | WO 2010023312 A1 * | | 3/2010 | A47J 31/4489 |
| GB | 2438596 | | 12/2007 | |
| IT | WO 2006136268 A1 * | | 12/2006 | A47J 31/4489 |
| WO | WO2006/136268 | | 12/2006 | |
| WO | WO 2006136268 A1 * | | 12/2006 | |
| WO | WO2010/023312 | | 3/2010 | |
| WO | WO 2010023312 A1 * | | 3/2010 | |

OTHER PUBLICATIONS

English translation of abstract of German Patent No. DE202005021112; 1 page.

* cited by examiner

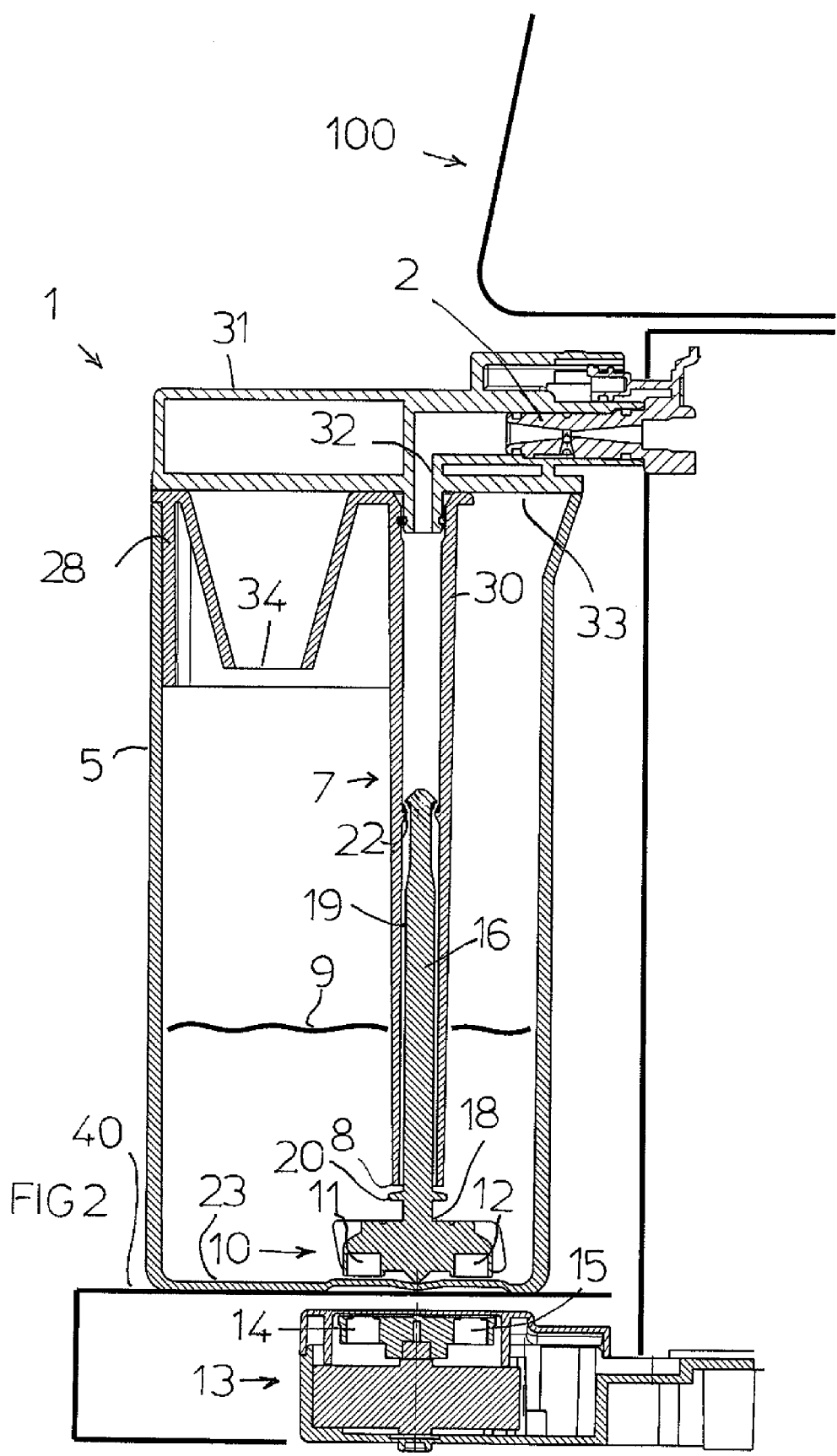

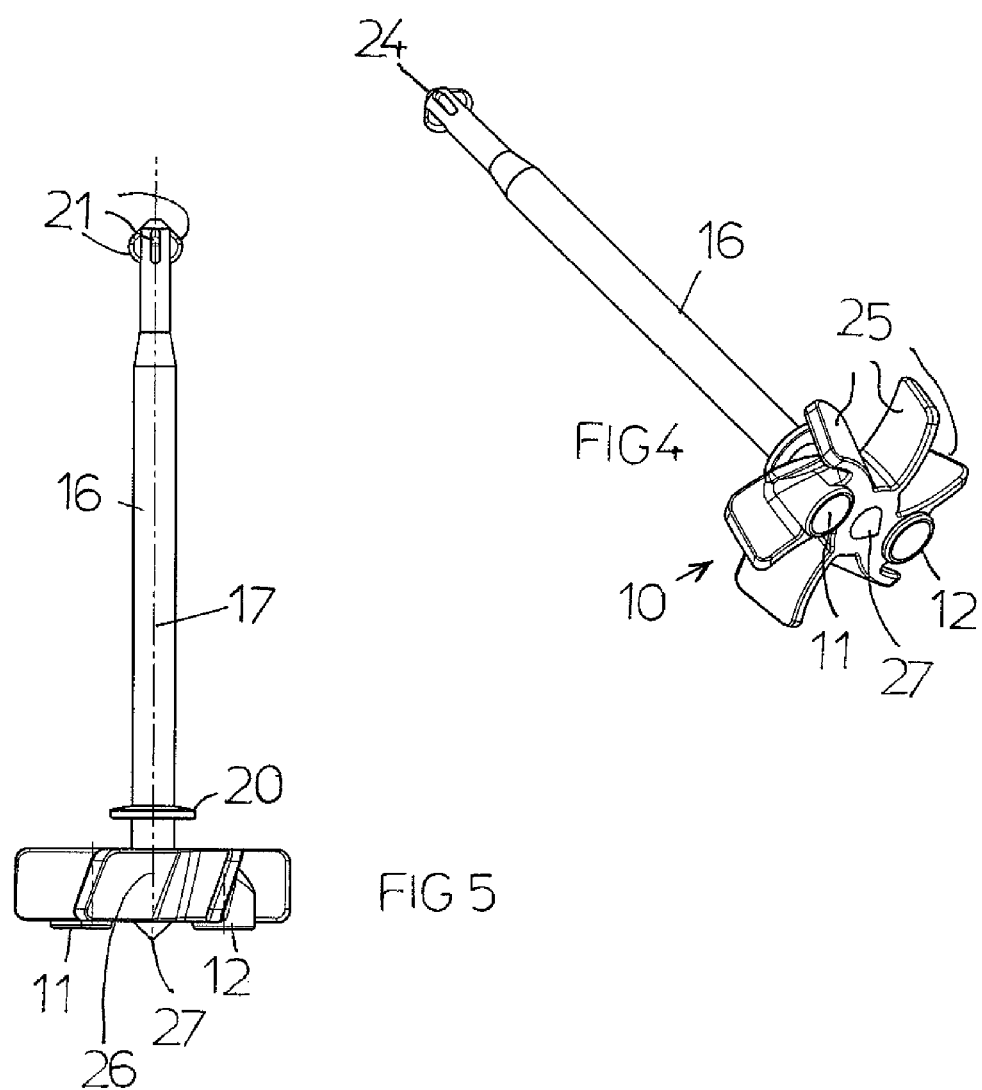

DEVICE ASSOCIABLE TO A STEAM DISPENSER FOR PRODUCTION OF AN AROMATIC BEVERAGE AND A COFFEE MACHINE EXHIBITING THE DEVICE

The present invention relates to a device associable to a steam dispenser for making an aromatic beverage and a coffee machine exhibiting the device.

The market has for some time offered coffee machines that are extremely versatile and can function both for preparing coffee or cappuccino and also other hot drinks and in particular chocolate, when associated to an appropriate device exhibiting a container and, internally thereof, a stirrer.

Sometimes the stirrer is a type activatable by a permanent-magnet motor located externally of the container.

The container is supplied with steam collected from the steam dispenser of the coffee machine.

In substance, the ingredients appropriately poured into the container are mixed by the stirrer and heated by the steam at an ideal temperature for chocolate beverage preparation.

A traditional device of the above-described type exhibits some drawbacks, among which the fact that the stirrer, being installable on a rotating pivot projecting from the bottom of the container, is difficult to access internally of the container in order to be removed for inspection, maintenance and cleaning, also because it is fouled by the beverage.

A further drawback consists in that when the activation of the stirrer is enabled by a permanent-magnet motor, an extremely precise construction is necessary, with very strict tolerances for the distance between the permanent magnets of the motor and the permanent magnets of the stirrer in order to have a correct magnetic transmission of the movement.

In another type of known device, the stirrer is fixed to the cover of the container and is activated in rotation by a mechanical transmission present in the cover of the container.

In this case, the structure of the container is extremely complex and unwieldy.

Further, the stirrer can give rise to annoying dripping problems when removed from the container together with the cover it is solidly constrained to, in order for the chocolate to be poured into the cup.

The technical task of the present invention is, therefore, to realise a device that is associable to a steam dispenser for making an aromatic beverage which obviates the above-described technical drawbacks.

In the scope of the technical task, an aim of the invention is to realise a device associable to a steam dispenser for making an aromatic beverage which exhibits a constructionally simple structure, easy accessibility to all its components, extremely precise functioning, simple operation and use, handling with no risk of fouling from the first step of adding the ingredients to the container to the final step of pouring the drink into the cup.

The technical objective, the stated aims and others besides, of the present invention, are attained with a device associable to a steam dispenser for making an aromatic beverage, characterised in that it comprises a container whereto a closing cover is removably applied, supporting either directly or indirectly supports both at least one tube for conveying the steam, sealingly couplable to said steam dispenser and configured so as to exhibit at least one steam outlet end below a minimum liquid level provided in said container for making the aromatic beverage, and at least one stirrer positioned adjacent to the inside wall of said container below said minimum level and having at least one permanent magnet for receiving the rotation movement thereof from a motor with permanent magnets outside said container.

Also preferably present are means for a loose connection of the stirrer to the conveying tube both in the direction of the rotation axis of the stirrer and in a radial direction to the rotation axis of the stirrer.

The loose connecting means preferably comprise a shaft powered to rotate on an axis thereof and loosely constrained in the direction of the axis thereof as well as in a radial direction to the axis thereof internally of the conveying tube; the shaft exhibits an end which is external of the conveying tube, which end carries the stirrer.

An air space for the steam flow passage is provided between the inner side wall of the conveying tube and the side wall of said shaft.

The shaft is preferably orientated with the axis thereof vertically arranged.

The shaft preferably exhibits a first stop outside the conveying tube such as to delimit the travel end thereof in the direction of introduction in the conveying tube, and a second stop within the conveying tube such as to delimit the travel end thereof in the direction of extraction from the conveying tube.

The second stop is preferably elastically yielding for allowing at least a coupling of the shaft to the conveying tube.

The stirrer preferably comprises at least a centrifugal impeller with warped radial blades.

The stirrer is preferably adjacent to the inner side of the bottom wall of the container.

The stirrer preferably comprises a support fulcrum for resting on the inner side of the bottom wall of the container, positioned on the extension of the shaft axis.

The container cover preferably comprises a first cover piece which carries a first portion of the conveying tube whereto the shaft is constrained, and at least a second cover piece, detachably engaged with the first cover piece, which carries a second portion of the conveying tube that is hermetically sealingly engageable with the first portion of the conveying tube.

The first cover piece preferably exhibits or delimits, with the container, at least a first opening for pouring the aromatic beverage.

The first cover piece preferably exhibits also a second opening for loading the ingredients for making the aromatic beverage into the container.

The second cover piece is preferably configured such as to close the first and/or the second opening of the first cover piece.

The present invention further discloses a coffee machine which comprises a device as described herein above.

Further characteristics and advantages of the invention will more fully emerge from the description of a preferred but not exclusive embodiment of the device associable to a steam dispenser for making an aromatic beverage according to the invention, illustrated by way of non-limiting example in the accompanying figures of the drawings, in which:

FIG. 2 is a side elevation of the device, vertically sectioned, associated to the coffee machine, in which only the steam dispenser, also vertically sectioned, and the cup resting plane with the underlying activating motor of the stirrer, also vertically sectioned, are shown in detail;

FIGS. 3, 4 and 5 are respectively a plan view from below, perspective and in side elevation of the stirrer.

Figure 1:
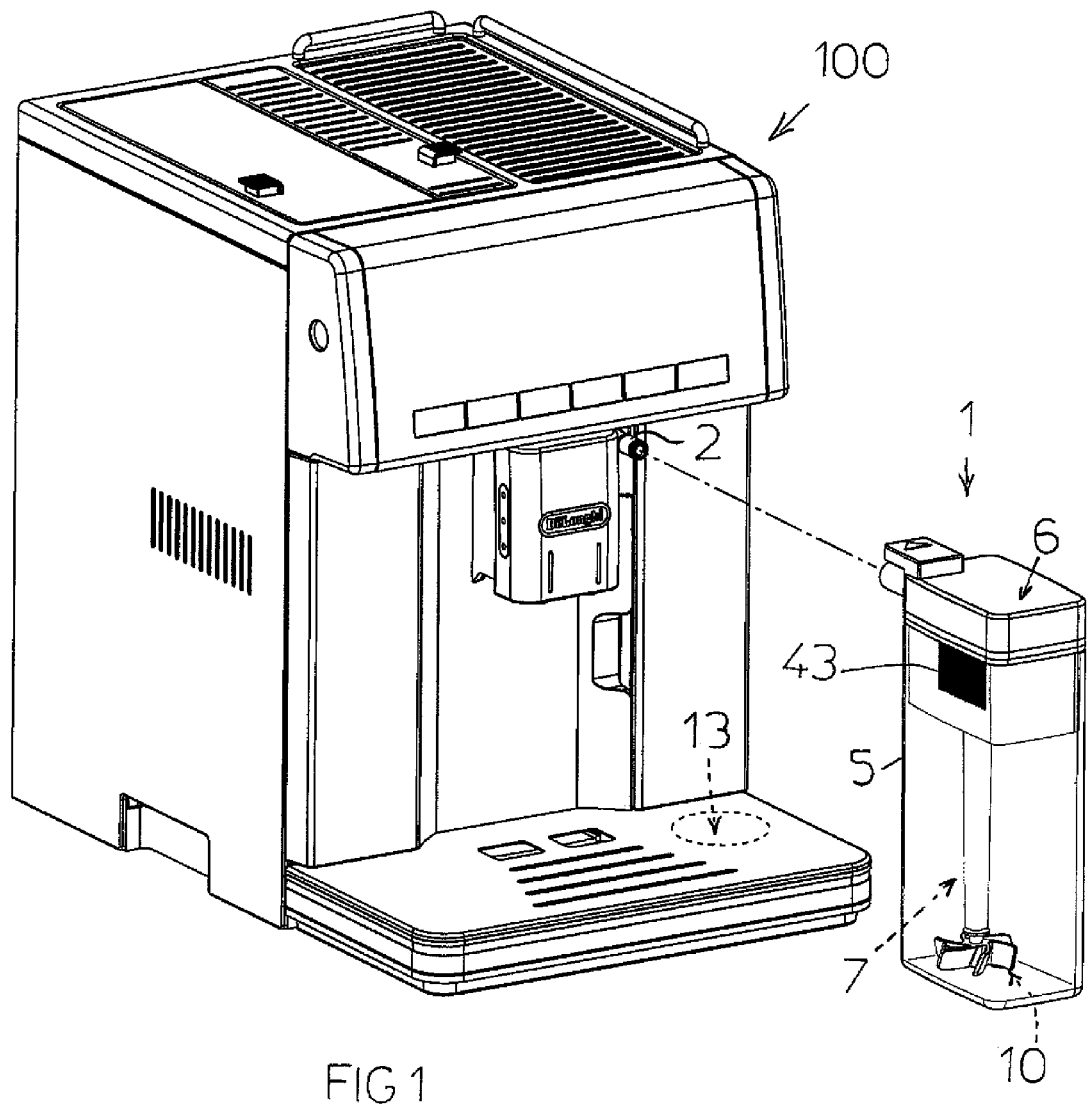
FIG. 1 is a perspective view of a coffee machine and the device associable thereto.
Figure 6:
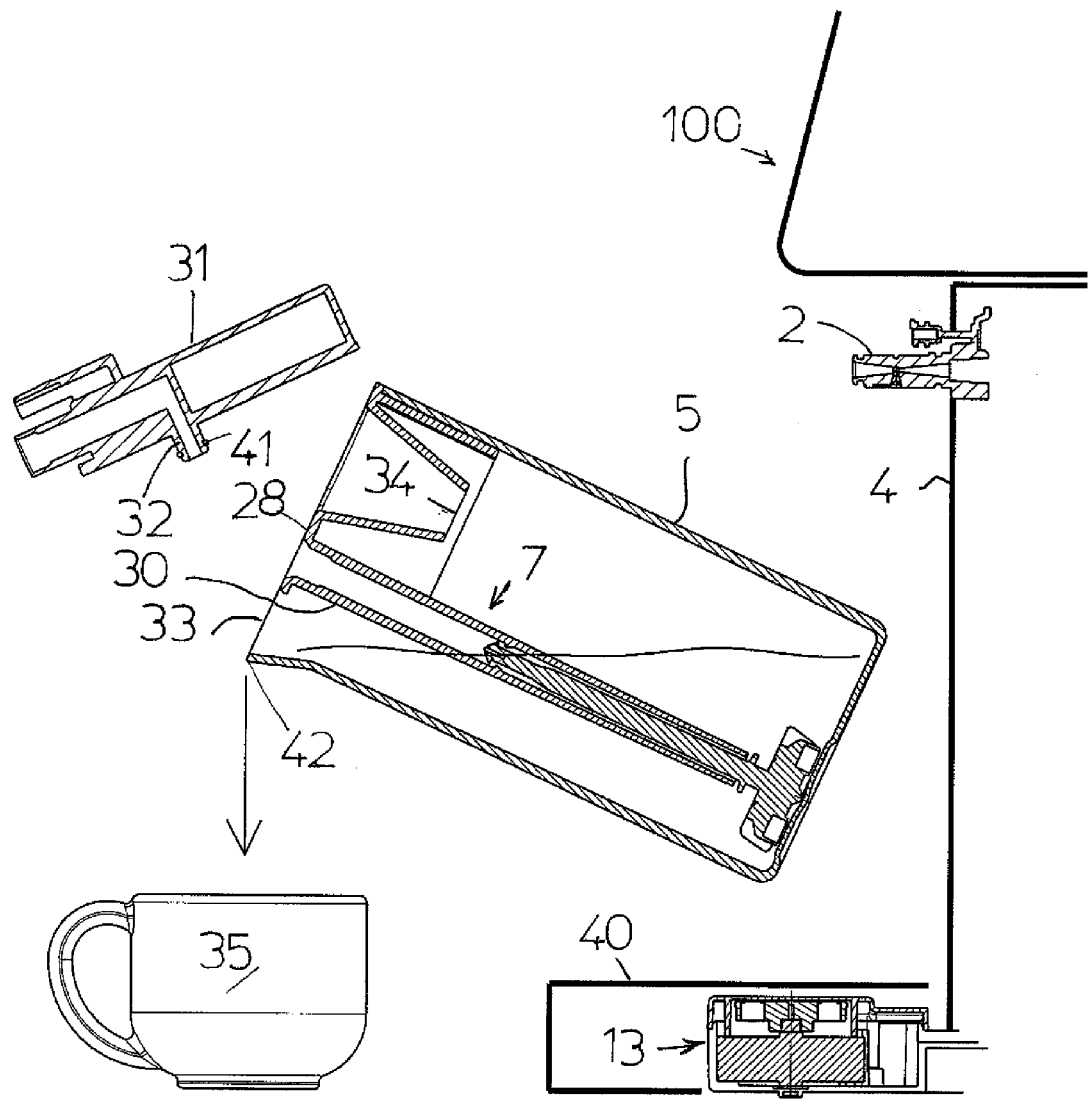
FIG. 6 is a section view of the container in the configuration assumed for pouring the beverage into the cup.

With reference to the figures of the drawings, a device is illustrated for making an aromatic beverage, denoted in its entirety by reference number 1.

The device 1 is associable to a steam dispenser 2, in particular it projects horizontally from a front panel 4 of a coffee machine 100.

The device 1 comprises a container 5 to which a closing cover 6 is removably applied.

The cover 6 supports a tube 7 for conveying the steam which is sealingly couplable to the steam dispenser 2 and is configured such as to exhibit at least a steam outlet end 8 located below a minimum liquid level 9 comprised in the container 5, for making an aromatic beverage, in particular chocolate.

The cover 6 also indirectly supports, as will become clear, via the conveying tube 7, a stirrer 10 positioned adjacent to the inner side of the bottom wall 23 of the container 5 below the minimum level 9.

The stirrer 10 is magnetically activated, and therefore exhibits a pair of permanent magnets 11, 12 for receiving the rotation movement thereof from a motor 13 having permanent magnets 14, 15 positioned coaxially to the stirrer 10 below the cup rest 40 of the coffee machine 100.

The device 1 exhibits means for loose connection of the stirrer 10 to the conveying tube 7 in both the direction of the rotation axis of the stirrer 10 and in the radial direction to the rotation axis of the stirrer 10.

The loose connection means comprise a shaft 16 guided to rotate on an axis thereof 17 and constrained loosely in the direction of its own axis 17 and in the direction that is radial to the axis 17 internally of the conveying tube 7.

The shaft 16 exhibits an end 18, external of the conveying tube 7, which fixedly carries the stirrer 10.

In particular, the shaft 16 and the stirrer 10 can be realised in a single piece.

The external diameter of the shaft 16 is calibrated to be smaller than the internal diameter of the conveying tube 7 such as to create an annular air space 19 between the two elements for the passage of the flow of steam.

The shaft 16 exhibits the axis 17 thereof vertically oriented, and slidable in a tract of the conveying tube 7 that is also vertical.

The shaft 16 exhibits a first stop outside of the conveying tube 7 such as to delimit the travel end thereof in a direction of introduction into the conveying tube 7 and a second stop, internal of the conveying tube 7, such as to delimit the travel end thereof in the direction of extraction from the conveying tube 7.

The first stop comprises an external flange 20 close to the end 18 which carries the stirrer 10, while the second stop, elastically yielding such as to enable at least the coupling of the shaft 16 to the conveying tube 7, comprises a plurality of formations 21 that are elastically retractable in a radial direction to the axis 17, distributed appropriately spaced to one another along an external circumference of the shaft 16 at the end 24 thereof opposite the end 18 at which the stirrer 10 is present.

The conveying tube 7 internally exhibits hooking teeth 22 which can be passed over by the formations 21 by means of radial elastic retraction during the coupling of the shaft 16 to the conveying tube 7.

The teeth 22 can be conformed such as to enable permanent coupling of the shaft 16 to the conveying tube 7, or can have a conformation which is such as also to enable decoupling of the shaft 16 from the conveying tube 7.

In the protracted position the formations 21 also guarantee coaxial centring of the shaft 16 in the conveying tube 7.

The stirrer 10 comprises a centrifugal impeller with warped radial blades 25.

As the steam flow exits from the outlet end 8 of the conveying tube 7 coaxially and in proximity of the axial aspiration of the impeller, the impeller entrains the steam axially and distributes it radially such as to strike all of the useful section of the container 5 at the level of the impeller. Thus the impeller guarantees homogeneity in the consistency but also the temperature of the treated liquid.

The permanent magnets 11 and 12 are in a diametrically opposite position with respect to the axis 26 of the impeller, which is located on the extension of the axis 17 of the shaft 16.

In particular the magnets 11 and 12 are completely sunken in the body of the impeller for reasons connected with food contact standards.

The stirrer 10 advantageously comprises a support fulcrum 27 for resting on the inner side of the bottom wall 23 of the container 5, also positioned on the extension of the axis 17 of the shaft 16.

The fulcrum 27 maintains the magnets 11 and 12 at a precise and calibrated distance from the inner side of the bottom wall 23 of the container 5 below which the motor 13 is positioned.

As the shaft 16 is loosely positioned in the conveying tube 7 in both the axial direction and the radial direction to the axial direction, by effect of the weight of the shaft 16 itself plus that of the stirrer 10, but especially by effect of the magnetic attraction the motor 13 exerts on the magnets 11 and 12, the fulcrum 27 is stably in contact with the inner side of the bottom wall 23 of the container 5, and consequently the magnets 11 and 12 are stably at the design distance from the motor 13, which distance is calibrated in order to obtain a correct magnetic transmission of the rotation movement, without there being any need to include complicated mechanical workings to within strict tolerances.

The cover 6 comprises a first cover piece 28 which carries a first portion 30 of the conveying tube 7 to which the shaft 16 is constrained and a second cover piece 31, detachably engaged with the first cover piece 28, which carries a second portion 32 of the conveying tube 7 which is hermetically engageable by means of a seal 41 with the first portion 30 of the conveying tube 7.

The second portion 32 of the conveying tube 7 has a right-angled development, with in particular a vertical tract which couples with the first portion 30 of the conveying tube 7, also vertical, and a horizontal tract which couples with the steam dispenser 2, also horizontal.

The first cover piece 28, together with the container 5, delimits a first opening 33 for pouring the aromatic beverage, and exhibits a funnel-shaped second opening 34 for loading the ingredients for the aromatic beverage preparation into the container 5.

At the first opening 33, the lateral wall of the container 5 defines a spout 42 for dispensing the drink.

The second opening 34 is suitable for conveying the powder ingredients into the container 5 at a distance from the lateral walls thereof in order to prevent, especially above the minimum level 9, the ingredients from adhering to the lateral walls, making them impossible to detach and dissolve in the beverage being produced, even where there is a vigorous stirring action.

The first piece 28 exhibits a complementary shape to the container 5 mouth in which it removably joints by pressure.

The second cover piece 31 is configured such as to close the first opening 33 and the second opening 34 of the first cover piece 28 on which it removably joints by pressure.

In this way exit of steam from the container 5 is prevented during production of the beverage.

By providing the second portion 32 of the conveying tube 7 in the second cover piece 31 which is removed when the beverage produced is poured into the cup, the produced beverage is prevented, when the container 5 is inclined, from rising up to the join zone of the conveying tube 7 and the steam dispenser 2, and thus also any possibility that the steam dispenser 2 might be contaminated is obviated.

When the stirrer 10 is functioning, the second cover piece 31 is applied to the first cover piece 28, which in turn is applied to the container 5, such that the container 5 is completely closed, while when the produced beverage is to be poured into the cup 35, only the second cover piece 31 is removed in order to open the opening 33, without the stirrer 10, which might annoyingly drip, also being extracted from the container 5.

Only in a case of inspection, maintenance or cleaning is the first cover piece 28 also detached from the container 5.

To facilitate grip, the container 5 exhibits a substantially parallelepiped shape and at least a knurled external apex zone 43.

The device associable to a steam dispenser for making an aromatic beverage as conceived herein is susceptible to numerous modifications and variants, all falling within the scope of the inventive concept; further, all the details are replaceable by technically-equivalent elements.

The materials used, as well as the dimensions, may in practice be of any type according to requirements and the state of the art.

The invention claimed is:

1. A device associable to a steam dispenser for making an aromatic beverage, comprising:
    a container; and
    a closing cover removably applied to the container, the closing cover supporting, either directly or indirectly, both:
        at least one tube for conveying the steam, the tube being sealingly connectable to the steam dispenser and having at least one steam outlet located below a minimum liquid level of the container; and
        at least one stirrer positioned outside of the tube and adjacent an inner side of a bottom wall of the container and below the minimum liquid level of the container, wherein the at least one stirrer is magnetically activated, and has at least a pair of stirrer magnets for receiving rotational movement thereof from a motor having at least a pair of motor magnets, the motor and the motor magnets being located outside of the container,
    wherein each of the at least one stirrer is connected to a shaft, wherein:
        a portion of the shaft is positioned inside the tube;
        the each of the at least one stirrer and the shaft share a rotational axis;
        the shaft is movably connected to the at least one tube in both a direction of the rotational axis of the shaft and in a direction radial of the rotational axis of the shaft;
        the shaft comprises a first stop located outside the tube to delimit travel of the shaft in a direction of introduction of the shaft into the tube;
        the shaft further comprises a second stop located within the tube to delimit travel of the shaft in a direction of extraction of the shaft out of the tube; and
    wherein the second stop, elastically yielding such as to enable at least the coupling of the shaft to the conveying tube, comprises a plurality of formations that are elastically retractable in the direction radial of the rotational axis of the shaft, the plurality of formations distributed appropriately spaced to one another along an external circumference of the shaft at its end.

2. The device of claim 1, wherein the shaft is movably constrained by the tube in the direction of the rotational axis, and in the direction radial of the rotational axis.

3. The device of claim 2, wherein an annular space for passage of steam is located between an inner side wall of the tube and an outer side wall of the shaft.

4. The device of claim 3, wherein the rotational axis of the shaft is oriented vertically.

5. The device of claim 1, wherein the second stop is elastically yielding to allow movable attachment of the shaft to the tube.

6. The device of claim 1, wherein the at least one stirrer includes at least one centrifugal impeller having warped radial blades.

7. The device of claim 1, wherein the at least one stirrer is positioned adjacent an inner side of a bottom wall of the container.

8. The device of claim 1, wherein the at least one stirrer includes a support fulcrum for resting on an inner side of a bottom wall of the container, the support fulcrum positioned on an extension of the rotational axis of the shaft.

9. The device of claim 1, wherein the closing cover includes a first cover piece that carries a first portion of the tube whereto the shaft is movably constrained, wherein the closing cover also includes at least a second cover piece, detachably engaged with the first cover piece, the second cover piece carrying a second portion of the tube that is engageable with a hermetic seal with the first portion of the tube.

10. The device of claim 9, wherein the first cover piece of the closing cover is provided with at least a first opening for pouring an aromatic beverage.

11. The device of claim 10, wherein the first cover piece of the closing cover is provided with at least a second opening for loading ingredients in the container for making an aromatic beverage.

12. The device of claim 9, wherein the second cover piece of the closing cover is configured to close the first or the second opening of the first cover piece of the closing cover.

13. A coffee machine comprising a device associable to a steam dispenser for making an aromatic beverage, the device comprising:
    a container; and
    a closing cover removably applied to the container, the closing cover supporting, either directly or indirectly, both:
        at least one tube for conveying the steam, the tube being sealingly connectable to the steam dispenser and having at least one steam outlet located below a minimum liquid level of the container; and
        at least one stirrer positioned outside of the tube and adjacent a side of a bottom wall of the container and below the minimum liquid level of the container, wherein the at least one stirrer is magnetically activated, and has at least a pair of stirrer magnets for receiving rotational movement thereof from a motor having at least a pair of motor magnets, the motor and the motor magnets being located outside of the container, wherein each of the at least one stirrer is connected to a shaft, wherein:

a portion of the shaft is positioned inside the tube;

the each of the at least one stirrer and the shaft share a rotational axis;

the shaft is movably connected to the at least one tube in both a direction of the rotational axis of the shaft and in a direction radial of the rotational axis of the shaft;

the shaft comprises a first stop located outside the tube to delimit travel of the shaft in a direction of introduction of the shaft into the tube;

the shaft further comprises a second stop located within the tube to delimit travel of the shaft in a direction of extraction of the shaft out of the tube; and wherein the second stop, elastically yielding such as to enable at least the coupling of the shaft to the conveying tube, comprises a plurality of formations that are elastically retractable in the direction radial of the rotational axis of the shaft, the plurality of formations distributed appropriately spaced to one another along an external circumference of the shaft at its end.

14. The coffee machine of claim 13, wherein the shaft is movably constrained by the tube in the direction of the rotational axis, and in the direction radial of the rotational axis.

15. The coffee machine of claim 14, wherein an annular space for passage of steam is located between an inner side wall of the tube and a outer side wall of the shaft.

16. The coffee machine of claim 13, wherein the second stop is elastically yielding to allow movable attachment of the shaft to the tube.

* * * * *